United States Patent

Peters

[15] 3,691,859
[45] Sept. 19, 1972

[54] INTERMITTENT DRIVE STRUCTURE
[72] Inventor: Charles L. Peters, Anaheim, Calif.
[73] Assignee: Box Innards, Inc., Anaheim, Calif.
[22] Filed: Sept. 1, 1970
[21] Appl. No.: 68,617

[52] U.S. Cl. ............74/120, 74/125.5, 74/130, 192/18 R, 192/144
[51] Int. Cl......F16h 29/20, F16d 71/00, F16d 67/02
[58] Field of Search.....74/120, 121, 125.5, 130, 131; 192/18 R, 144

[56] References Cited
UNITED STATES PATENTS
1,476,766  12/1923  Reynolds..................74/125.5
2,997,889  8/1961  Schjeldahl et al. .......74/125.5

Primary Examiner—Allan D. Herrmann
Attorney—Edward D. O'Brian

[57] ABSTRACT

An intermittent drive structure for driving a driven shaft employing a clutch can be constructed utilizing a means for transmitting motion to the clutch so as to cause rotation of the driven shaft and a drive means for causing oscillation of the means for transmitting motion. Such a structure employs means for opening the clutch at one extreme of the oscillation caused by the drive means and for closing the structure at the other extreme of the drive means.

8 Claims, 4 Drawing Figures

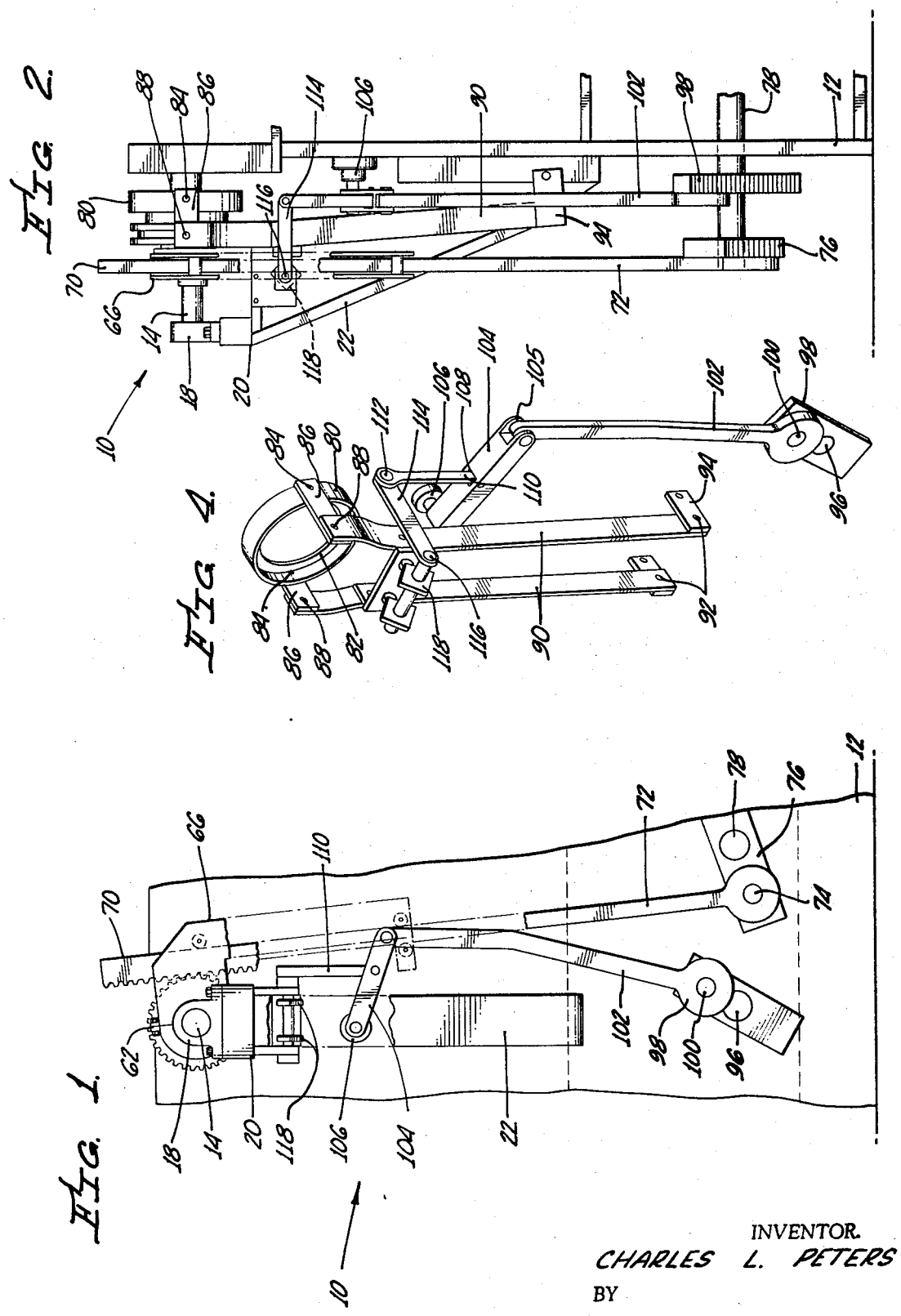

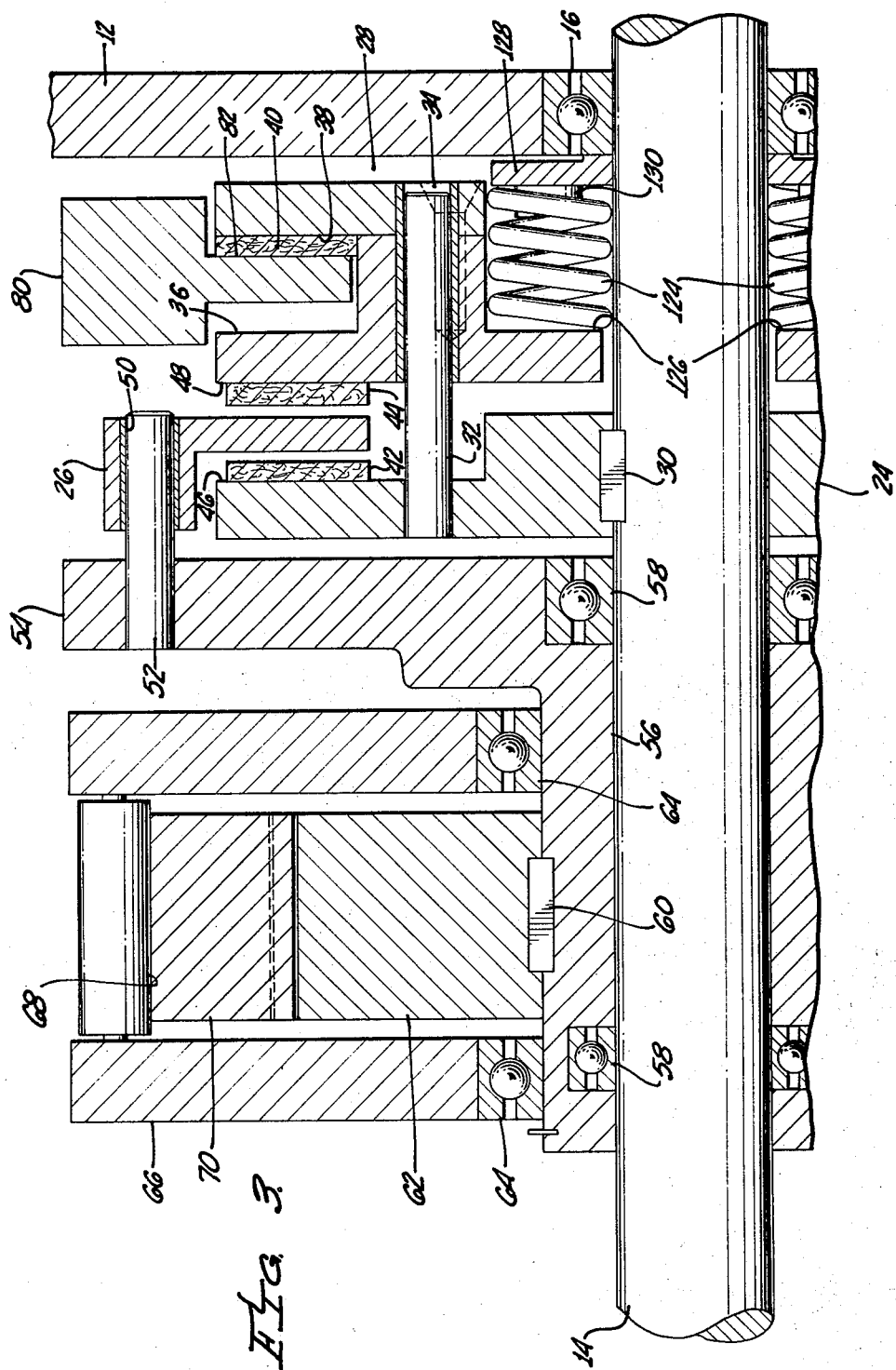

INTERMITTENT DRIVE STRUCTURE

CROSS-REFERENCE TO RELATED APPLICATIONS

Charles L. Peters U.S. Pat. application entitled "-Machine for Creating Divider Structures Such As Are Used As Internal Partitions Within A Box"Ser. No. 68,616, filed Sept. 1, 1970. The entire disclosure of this co-pending patent application is incorporated herein by reference.

BACKGROUND OF THE INVENTION

In many different machines it is desired to periodically rotate a shaft a given amount in a given direction, and to have the shaft so that it does not rotate or move except as it is being deliberately rotated. It is considered that it would be impossible to set forth in this specification all of the applications for intermittent drive structures used to drive a shaft in such a manner. On such application is shown in the Charles L. Peters co-pending U.S. Pat. application entitled "Machine For Creating Divider Structures Such As Are Used As Internal Partitions Within A Box," Ser. No. 68,616 filed Sept. 1, 1970.

A great many different intermittent drive structures for use in driving a shaft in such a manner have been developed and used. Because of the number of such drive structures and the various different ways that they have been constructed it is difficult if not impossible to accurately generalize with respect to them. However, it is considered that such prior intermittent drive structures for driving a shaft have all been disadvantageous for one or more reasons.

It is considered that the most common of such drive structures have been particularly disadvantageous because they will not give prolonged, effective service. In short, they tend to wear out to easily and tend to require undesirably frequent repair and/or replacement. In general such prior drive structures either tend to operate in such a manner as to cause an undesired "sharp" or "quick" breaking effect, stopping the rotation of the driven shaft, or tend to inadequately hold the shaft against movement after the shaft has been driven or rotated.

Both of these manners of operation are disadvantageous in many applications. In most equipment if a precise indexing effect is to be achieved by periodically driving a shaft the shaft should not tend to rotate after it has been driven. Similarly a "quick" or "sharp" breaking effect is undesired in a driven shaft in most equipment because it will tend to set up unnecessary strains and stresses and may cause vibration. These items are disadvantageous to machine operation and wear.

A broad objective of the present invention is to provide a new and improved intermittent drive structure which overcomes various disadvantageous and limitations of prior related drive structures for periodically rotating a shaft a given amount in a given direction. A related objective of the present invention is to provide a drive structure for this purpose which will not produce any unnecessary stresses, strains or vibrations. Another objective of the present invention is to provide a drive structure of the type described which will operate effectively over a prolonged period without significant or noticeable wear. A further objective of the present invention is to provide an intermittent drive structure as described which effectively stops undesired shaft rotation between periodic movement or rotation of the driven shaft.

In accordance with this invention these objectives are achieved in an intermittent drive structure including: a driven shaft, a clutch for transmitting rotation to the driven shaft, a means for transmitting motion to the clutch so as to cause rotation of the driven shaft, a drive for oscillating the means for transmitting motion in an amount corresponding to the desired shaft rotation and a means for opening the clutch at one extreme of the oscillation of the motion caused by the drive and for closing the clutch at the other extreme of the oscillation of the motion caused by the drive.

Preferably in order to insure against rotation of the shaft when the clutch is opened a brake which is closed when the the clutch is opened is provided in this structure. Preferably in order to again insure against unwanted stresses, strains or vibration the drive used is an eccentric drive which controls the speed of rotation of the shaft so that such speed is at a maximum between the extremes of the oscillation caused by it and which controls the speed of the rotation of the shaft so that the shaft is not rotated or is rotating only an imperceptible amount when the clutch is opened and closed.

BRIEF DESCRIPTION OF THE DRAWINGS

Further details of this invention as well as specific advantages of it will be apparent from a detailed consideration of the remainder of this specification in conjunction with the accompanying drawings in which:

FIG. 1 is a front elevational view, partially broken away, of a presently preferred embodiment or form of an intermittent drive structure in accordance with this invention;

FIG. 2 is a side elevational view taken from the right of FIG. 1;

FIG. 3 is a partial cross-sectional view, greatly enlarged, taken at line 4—4 of FIG. 1; and FIG. 4 is an isometric view of certain parts of the drive structure shown in the preceeding figures indicating their operation.

The accompanying drawings are primarily intended for use in explaining the construction of the presently preferred embodiment or form of an intermittent drive structure in accordance with the invention. Those skilled in mechanical design will realize that the essential features or principals embodied within the precise structure illustrated can be embodied within other differently appearing and somewhat differently constructed drive structures through the use or exercise of routine engineering skill. Such features or principals of the invention are considered to be clearly summarized in the appended claims.

DETAILED DESCRIPTION OF THE PREFERRED EMBODIMENT

In the drawings there is shown an intermittent drive structure 10 of the present invention mounted upon a machine wall 12. This structure 10 incorporates and is used to drive a driven shaft 14 extending through the wall 12. The shaft 14 is supported with respect to the wall 12 by means of a bearing 16. It is also supported by means of another bearing 18 located upon a bracket 20 extending from the wall 12. For convenience of construction a brace 22 extends between the wall 12 and the bracket 20.

The structure 10 includes what may be regarded as a clutch or clutch means having a motion transmitting plate 24, a movable plate 26 and an actuating collar 28 and various associated parts as hereinafter indicated. These plates 24 and 26 and the collar 28 are all concentric about the axis of the shaft 14. The motion transmitting plate 24 is secured to the shaft 14 in a conventional manner as by a key 30 so that this plate 24 will rotate with the shaft 14. The plate 24 carries a series of equally spaced pins 32 located concentrically around the axis of the shaft 14 which extends into holes 34 in the collar 28. These pins 32 fit in such a manner that the collar may be shifted relative to the plate 24 by the pinds 32 sliding within the holes 34.

This collar 28 fits completely around the shaft 14 and is provided with a continuous peripheral groove 36. Preferably a surface 38 of the groove 36 carries a layer 40 of a friction material of a type commonly used for brake linings. Similar layers of friction material 42 and 44 are provided on spaced opposed surfaces 46 and 48, respectively, on the plate 24 and the collar 28. These surfaces 46 and 48 are located further from the axis of the shaft 14 than the pins 32. The movable plate 26 fits between the layers 42 and 44 in such a manner that the structure constituting the clutch can be actuated or closed by the collar 28 being moved towards the plate 26, bringing the layers 42 and 44 into engagement with this plate 26.

The plate 26 includes a series of equally spaced peripheral holes 50 located concentrically around the axis of the shaft 14 which are adapted to slidable receive other pins 52 extending from the periphery of a disc-like flange 54 on a motion transmitting cylindrical sleeve 56 located around the shaft 14. This sleeve 56 is rotatably held upon the shaft 14 by means of bearings 58. It is secured by any convenient manner such as by a key 60 to a conventional spur gear 62 in such a manner that the gear 62 is concentric with the shaft 14. The sleeve 56 carries other bearings 64 which rotatably support a housing 66 with respect to both the shaft 14 and the sleeve 56. This housing 66 is formed with an internal sliding or linear bearing cavity 68 which is adapted to be utilized in holding a gear rack 70 so that it always engages the spur gear 62.

The gear rack 70 is carried by a drive arm 72 mounted upon a pivot 74 on a crank arm 76 carried by a drive shaft 78. This drive shaft 78 may be mounted with respect to the wall 12 in any convenient conventional manner. With this construction each time the drive shaft 78 rotates the rack 70 will be caused to oscillate within the housing 66 so as to cause oscillation of the spur gear 62. Because of the housing 66 is rotatably mounted it will rock back and forth, accommodating the different angles at which the gear rack 70 will extend during the rotation of the drive shaft 78, always holding the gear rack 70 in contact or engagement with the spur gear 62. Such motion of the spur gear 62 will be transmitted through the flange 54 and the pins 52 to the movable plate 26. Thus, this movable plate 26 will oscillate back and forth around the axis of the shaft 14 as the drive shaft 78 is rotated.

With the structure 10 a control ring 80 determines whether or not such rotation will be transmitted to the shaft 14. This ring 80 includes an internal flange 82 extending into the groove 36. This ring 80 is carried by means of pivots 84 on arms 86 which are in turn attached by the other pivots 88 to a yoke structure 90. This yoke structure 90 is mounted by means of other pivots 92 to short arms 94 extending from the wall 12.

The position of the yoke structure 90 and the ring 80 is impart governed by means of another drive shaft 96 is preferably synchronized by conventional means such as gears or a chain drive so as to rotate in synchronism with the drive shaft 78. Because of the means of synchronizing the two shafts 78 and 96 are conventional they are not illustrated.

This drive shaft 96 carries a crank arm 98 which in turn carries a pivot 100 which connects it to an end of a drive rod 102. The other extremity of this drive rod 102 is secured to a rocker arm 104 carried upon the wall 12 by means of another pivot 106 secured to this wall. Intermediate its ends this rocker arm 104 carries by means of a pivot 108 an upwardly extending link 110. This link 110 is secured by a pivot 112 to an end of a lever arm 114. This lever arm 114 is secured intermediate its ends to the bracket 20 by mean of another pivot 116.

The end of the lever arm 114 remote from the pivot 112 carries a push structure 118 which is adapted to bear against the yoke structure 90 so as to force the ring 80 into a position where the flange 82 engages the friction material 40. It will be realized that during the rotation of the drive shaft 96 as shown by the arrows at the bottom of FIG. 4 the drive rod 102 and the connected structure moves up and down. Such motion imparts to the lever arm 114 oscillating action as shown by the arrows at the left of FIG. 4 adjacent to the push structure 118. When the push structure 118 exerts pressure against the yoke structure 90 the ring 80 will be moved to the right as seen in FIG. 3.

When this ring structure 80 is in a right hand position as shown in FIG. 3 the flange 82 will bear against the layer 40 and the groove 36. This motion of the ring 80 to the right as shown in FIG. 3 will exert a pressure upon the collar 28. Such pressure will accomplish several things. It will cause the compression of a series of coil springs 124 located in small holes 126 in the collar 28. These holes 126 and the springs 124 are located equidistant from one another around the axis of the shaft 14. They bear against a small retainer and thrust ring 128 disposed around the shaft 114 so that it is free to rotate with the collar 28. It will be noted that the thrust ring 128 bears against the bearing 16. Preferably the ring 128 carries small projections 130 which fit within the springs 124 so as to stabilize them.

When the ring 80 is moved to the right as shown in FIG. 3 during the rotation of the drive shaft 96 so as to cause the collar 28 to also be moved to the right the layer 44 of braking material will also be pulled away from the movable plate 26. Such release of pressure as well as contact with the layer 42 will cause the movable plate 26 to be "uncoupled" from the plate 24 and the collar 28, opening the clutch structure described. Hence, at this point when the ring 80 is moved to the right no motion will be transmitted to what is described herein as the clutch structure from the drive shaft 78.

The plate 26 in moving to the open position described will tend to slid slightly on the pins 52. Although it is not necessary means such as weak springs can be located on the pins 52 so as to bias the plate 26 away from the flange 54 only so far that this plate 26 will clear both the layers 42 and 44 when what as described herein as the clutch structure is in an open position.

When the ring 80 is moved to the right as shown in FIG. 3 through the rotation of the shaft 96 another important operation is performed. In effect the layer of friction material 40 engages the flange 82 so that a braking action is achieved preventing further rotation of the collar 28. By virtue of the sliding connection between the pins 32 and the holes 34 when the collar 28 is braked to stop through movement of the ring 80 the plate 24 is also stopped from moving. Since this plate 24 is secured to the shaft 14 when the plate 24 no longer rotates due to the braking action described the shaft 14 will no longer rotate.

When, through rotation of the drive shaft 96, the push structure 118 ceases to apply pressure to the yoke structure 90 so as to no longer rotate this structure 90 inwardly towards the wall 12 the springs 124 will expand. This will result in movement of the collar 28 so as to sandwich the movable plate 26 between the layers 42 and 44. This will be accomplished with some light movement of the plate 26 upon the pins 52. When the collar 28 has been moved in this manner what is described herein as the clutch structure is closed and this structure is coupled through the flange 54 and the sleeve 56 and the spur gear 62 to rotation of the drive shaft 78 because of the connection of the drive arm 72 to the crank arm 76 and to the rack 70 and because of the interengagement of this rack 70 with the gear 62. Hence, when what is described as the clutch structure is closed rotation of the drive shaft 78 will result in rotation of the shaft 14. When the ring 80 is moved so as to permit the collar 28 to move to a closed position as herein described the flange 82 will also be moved out of contact with the layer 40 so that a braking action is achieved.

The synchronization of the various motions described in the preceding is considered quite important in minimizing wear so as to achieve long, reliable performance and so as to achieve a minimum of stresses and strains on driven machine parts and so as to minimize vibration. With a structure as described and constructed as shown in the drawings the drive shaft 78 and the crank arm 76 act as an eccentric drive or drive means so as to move the gear rack 70 and of course the spur gear 62 and the various parts connected to this gear 62 at a variable rate which decreases to zero and reverses at the extremes of the travel of the gear rack 70. Obviously the associated and connected parts driven by this gear rack 70 are moved at a corresponding variable rate which decreases to zero and reverses at the extremes of the oscillation caused through the operation of the described eccentric drive. This is considered advantageous inasmuch as the drive structure used to cause rotation of the shaft 14 acts much like a brake for the shaft 14.

As previously indicated the rotation of the drive shaft 96 is synchronized with the rotation of the drive shaft 78 so that the ring 80 is moved to either an opened or a closed position of what is described herein as the clutch structure as nearly as possible at the same time that the rack 70 changes the direction of its movement. As a result of such synchronization, wear of various parts which contact one another in the clutch structure described and in the brake structure described is effectively minimized.

The use of the flange 82 against the layer 40 as a brake is theoretically unnecessary with the complete intermittent drive structure 10 in stopping rotation of the shaft 14 when what as described herein as the clutch structure is opened. However, this brake structure is desirable if for some reason such as an error in machine design there is not absolute synchronization between the clutch structure actuation and the extremes of travel of the gear rack 70. Also this described brake structure may be necessary in case the inertia of something being driven by the shaft 14 would tend to cause rotation of the shaft 14 when the clutch structure as described is opened.

From a careful consideration of the preceding it will be realized that the intermittent drive structure 10 described is by comparison with other related structures a comparatively simple effective structure capable of giving prolonged, reliable performance. This drive structure 10 is particularly valuable in intermittently driving feed rollers or the like which must only be driven a precise amount at periodic intervals as in an indexing operation.

I claim:

1. An intermittent drive structure which comprises:
    a driven shaft,
    a mechanical, friction clutch means for transmitting motion to said driven shaft, said clutch means being capable of being opened and closed,
    a mechanical, friction brake means for holding said driven shaft against rotation when said clutch means is opened, said brake means being connected to said shaft,
    means for transmitting motion to said clutch means so as to cause rotation of said driven shaft, said means for transmitting motion being connected to said clutch means,
    drive means for oscillating said means for transmitting motion, said drive means being connected to said means for transmitting motion, and
    a single mechanical linkage means for opening said clutch means at one extreme of the oscillation of the motion caused by said drive means and for closing said clutch means at the other extreme of the oscillation of the motion caused by said drive means and for operating said brake means so as to stop rotation of said driven shaft when said clutch means is open.

2. An intermittent drive structure as claimed in claim 1 wherein:
    said drive means oscillates said means for transmitting motion so that the motion imparted to said means for transmitting motion and to said driven shaft when said clutch means is closed is at a variable rate which decreases to zero at the extremes of the oscillation caused by said drive means.

For convenience of reference, the following claim 3 which is not being amended is reproduced in this amendment without change:

3. An intermittent drive structure as claimed in claim 2 wherein:

said drive means is an eccentric drive.

4. An intermittent drive structure as claimed in claim 1 wherein:
said brake means forms a part of said clutch means.

5. An intermittent drive structure as claimed in claim 1 wherein:
said means for transmitting motion includes,
a spur gear connected to said clutch means, and
a rack gear engaging said spur gear, said rack gear being connected to said drive means,
said drive means includes,
an eccentric and a drive arm connected to said eccentric, said eccentric being synchronized with said means for opening and for closing said clutch means so that the motion imparted to said spur gear and to said driven shaft when said clutch means is closed is at a variable rate which decreases to zero at the extremes of the oscillation caused by motion of said eccentric being transmitted through said drive arm and said gear rack to said spur gear,
said brake means forms a part of said clutch means, and including,
a retainer housing mounted about the axis of rotation of said spur gear, said housing holding said gear rack in engagement with said spur gear and being capable of rotating about the axis of said spur gear during the movement of said drive arm.

6. An intermittent drive structure as claimed in claim 1 wherein:
said means for transmitting motion includes,
a spur gear connected to said clutch means, and
a rack gear engaging said spur gear, said rack gear being connected to said drive means.

7. An intermittent drive structure as claimed in claim 6 wherein:
said drive means includes:
an eccentric and a drive arm connected to said eccentric, said eccentric being synchronized with said means for opening and for closing said clutch means so that the motion imparted to said spur gear and to said driven shaft when said clutch means is closed is at a variable rate which decreases to zero at the extremes of the oscillation caused by motion of said eccentric being transmitted through said drive arm and said gear rack to said spur gear.

8. An intermittent drive structure as claimed in claim 7 including:
a retainer housing mounted about the axis of rotation of said spur gear, said housing holding said gear rack in engagement with said spur gear and being capable of rotating about the axis of said spur gear during the movement of said drive arm.

* * * * *